(12) United States Patent
Senn et al.

(10) Patent No.: US 8,995,010 B2
(45) Date of Patent: Mar. 31, 2015

(54) DIGITAL PRINTER

(75) Inventors: Thomas Senn, Dielsdorf (CH); Francis Lamy, Zollikon (CH)

(73) Assignee: X-Rite Europe GmbH, Regensdorf (CH)

( * ) Notice: Subject to any disclaimer, the term of this patent is extended or adjusted under 35 U.S.C. 154(b) by 2212 days.

(21) Appl. No.: 10/894,868

(22) Filed: Jul. 20, 2004

(65) Prior Publication Data

US 2005/0018219 A1 Jan. 27, 2005

(30) Foreign Application Priority Data

Jul. 23, 2003 (EP) .................................. 03016534

(51) Int. Cl.
*G06F 15/00* (2006.01)
*H04N 1/60* (2006.01)
*G01J 3/50* (2006.01)
*G06K 1/00* (2006.01)

(52) U.S. Cl.
CPC ............... *H04N 1/6033* (2013.01); *G01J 3/50* (2013.01)
USPC ............ 358/1.9; 358/518; 358/523; 358/520; 358/1.15; 358/504; 382/167; 347/19

(58) Field of Classification Search
USPC ............ 358/1.9, 518, 520, 522–525; 347/19; 382/167
See application file for complete search history.

(56) References Cited

U.S. PATENT DOCUMENTS

| 5,680,327 | A | 10/1997 | Cook et al. ..................... 364/526 |
| 6,075,888 | A * | 6/2000 | Schwartz ...................... 382/167 |
| 6,086,274 | A | 7/2000 | Krzyminski .................. 400/703 |
| 6,580,524 | B1 | 6/2003 | Weichmann et al. |
| 6,690,471 | B2 * | 2/2004 | Tandon et al. ................. 356/420 |
| 2002/0080373 | A1 | 6/2002 | Collette et al. |
| 2002/0162470 | A1 | 11/2002 | Shimamura ................... 101/484 |
| 2002/0180996 | A1 | 12/2002 | Allen et al. |
| 2003/0063275 | A1 | 4/2003 | Hubble, III et al. .......... 356/319 |
| 2003/0202194 | A1 * | 10/2003 | Torigoe et al. ................. 358/1.9 |

FOREIGN PATENT DOCUMENTS

| DE | 197 22 073 A1 | 12/1998 |
| DE | 198 44 495 A1 | 4/2000 |
| EP | 0 741 491 A2 | 11/1996 |

* cited by examiner

*Primary Examiner* — Quang N Vo

(74) *Attorney, Agent, or Firm* — McCarter & English, LLP

(57) ABSTRACT

A digital printer is equipped with a built-in color measurement device in the form of a colorimeter or spectral photometer, as well as with color management support. The built-in color measurement device is used for control and optimization of the print output, especially for the simplification, optimization and automation of the work processes and for the verification of the output results.

25 Claims, 6 Drawing Sheets

DIGITAL PRINTER

FIELD OF THE INVENTION

The invention relates to digital printers. More particularly, the invention relates to a digital printer having a printing head, drive means for the printing head, a transport device for the substrate to be printed, and a color measurement device for the colorimetric measurement of measurement fields found on the substrate and a digital control for the transport device.

BACKGROUND

Color management today is a recognized process for the achievement of a consistent color reproduction on the most different input and output devices. The corresponding algorithms and processes are well known and corresponding products are on the market (for example, the software "Profile Maker" of the company Gretag-Macbeth AG). Highest demands are posed on color management systems. Especially for the output of reference prints for evaluation by the client (so called proofs)

However, the processes and procedures used today in the concrete implementation of a color management workflow have significant points of weakness. The application of color management is complex. Users are often only insufficiently supported. The potential sources of error are enormous. Today, the correct application of the workflows is/can be only visually evaluated. In order to simplify the processes, future color management systems must become more intelligent. In particular, digital printers must become self-calibrating in order to unburden the user. For this, it is necessary to integrate color measurement devices directly into the digital printer. Patent applications have been filed lately by different companies (see for example US-A 2002/0080373, US-A 2002/162470, DE-A 19844495, U.S. Pat. No. 5,680,327, DE-A 19722073) which essentially have the goal to automate the capture of the measurement data which are required in the color management workflow for the generation of the color profiles (ICC Profile) by integration of the color measurement device into digital printers, as well as to achieve a consistent color output between devices of different manufacturers.

An essential impediment to the broad use of color management solutions lies in the complexity and the thereby induced error susceptibility of the processes. Although the systems described in the mentioned patent applications contribute to the simplification/optimization of the color management workflow, they do not cover in any way aspects important for the reduction of system complexity. Especially, the systems described in the mentioned patent applications do in no way cover the aspect of profile selection, profile verification, efficient dealing with the wet-dry-problem, optimization of the amount of color used, as well as control of the output result in general and the aspect of retraceability.

SUMMARY OF THE INVENTION

It is therefore the most general goal of this invention to improve a digital printer with an integrated color measurement device and integrated color management in such a way that the aspects of a color management supported workflow described in the following are realized in a manner optimal for the user.

This object underlying the invention is achieved through the digital printer in accordance with the invention characterized by the features of the independent claim 1.

Preferred embodiments and further developments of the digital printer in accordance with the invention are the subject of the dependent claims.

More concretely, the invention deals according to a first main aspect with system optimization and improvement of the error susceptibility behavior upon data capture.

The capture of the required data should be as simple as possible. The classical starting point for the color management of remission measurement originals consists in the measurement of a two-dimensional test chart by an xy-measurement system. This often used starting point is typically realized in an ink-jet printer system (such as illustrated, for example, in US-A 2002/0080373) in that a calorimetric measurement head is mounted parallel to the movable print head for movement therewith. The combination of the paper feed and the transverse movement of the measurement head transverse to the feed direction leads to the desired scanning of the two-dimensional test chart. This implementation leads to a relatively expensive and error prone solution, since the moved mass increases and the calorimetric measurement head typically is subjected to high soiling by color mist whereby the quality of the measurement results and thereby the system performance suffers.

According to the mentioned first main aspect of the present invention, the system costs are optimized and the behavior regarding the error susceptibility of the process significantly improved in that the test fields used for the measurement and profiling are output and measured in one row at a fixed position of the test chart, preferably at the edge of the paper.

A further concrete object of the present invention resides in the improvement of the handling of profiles.

The generally known starting point today in the device profiling is that for a certain combination of paper, color, UCR adjustments and so on a so-called output profile is calculated. Depending on the selected print conditions during the output (for example the paper selected) a certain profile must then be pre-selected, typically in the adjustments of the printer driver, in order to achieve the correct output. This adjustment is error prone. A wrong adjustment leads however to an incorrect output result.

This difficulty is solved according to a further main aspect of the present invention in that the selection of the correct color profile can be carried out automatically by the digital printer itself. According to an additional aspect, further parameters such as, for example, the knock away behavior of the printing material are classified and this knowledge used to carry out corresponding corrections/classifications which allow an optimization of the printing result.

A further concrete object of the invention relates to the verification of the profile selection.

Because of the large color error upon an incorrect profile selection, irrespective in which manner an output profile of a digital printer is determined (automatically through the printer itself or through manual selection), it must be ensured in a user-friendly system that the correct profile was selected and that the profile is still valid and has not become invalid or unusable, for example, through a drifting away of the printing results. A further main aspect of the present invention shows how the validity of the output profile can be verified on the basis of measurements of a test wedge and/or the output print. It is further shown in a further aspect how the validity of the profiling can be displayed to the user in an intuitive and user-friendly manner by a printout of additional information.

A further difficulty which is generated during the use of color management functions integrated into digital printers and the measurement technology needed therefor resides in the problem that in most printing processes (inkjet, offset, flexo . . . ) wet color is applied onto a dry paper. The colors change after printing because of the drying processes. A measurement system which measures the colors temporally close to printing will therefore after the color has dried never deliver the same measurement values for the same color. However, the completely dried print is determinative for the evaluation of the final print result.

A further concrete object of the present invention resides therefore in the correlation of the values measured internally, with the help of mathematical and/or measurement technology means, with the values measured externally in the dry condition and to integrate this correlation into an ICC compatible workflow seamlessly and optimally for the user. It is further shown in a further partial aspect how by temporally spaced duplicate measuring of the same sample with the color measurement system integrated in the digital printer the drying aspects can be characterized and compensated.

Apart from the four color (CMYK) pictures, the correct output of special colors (Spot Colors) during printing is increasingly important. A further concrete object of the present invention resides in that the integrated measurement system can be used for the imminent important control of spot colors on the digital print. It is thereby especially shown how dynamically generated measurement strips can be excellently used for this purpose and/or how alternatively the colors can be measured directly during use.

A further impediment to the correct application of today's digital print systems consist in that the paper type must be pre-selected from a certain class. An inkjet printer system, for example, derives the color amount applied to the paper from this paper type class. As soon as new unknown papers are used, the print result will be of lesser quality because of the unknown amount of color to be applied.

According to a further important aspect of the invention, this problem is solved with a calibration algorithm which refers back to the incorporated sensor and which makes it possible to determine the optimal amount of color to be applied with the process shown, in order to achieve on the one hand the largest possible color space and on the other hand apply only the reasonably necessary amount of color onto the print.

It is furthermore important that such intelligent printer systems can be easily checked for proper function. A further aspect of the present invention shows the possibility how to periodically test the proper function of such a true color printer.

BRIEF DESCRIPTION OF THE DRAWINGS

The invention will be further described in the following by way of the drawing. It shows.

DETAILED DESCRIPTION OF THE INVENTION

Figure 1:
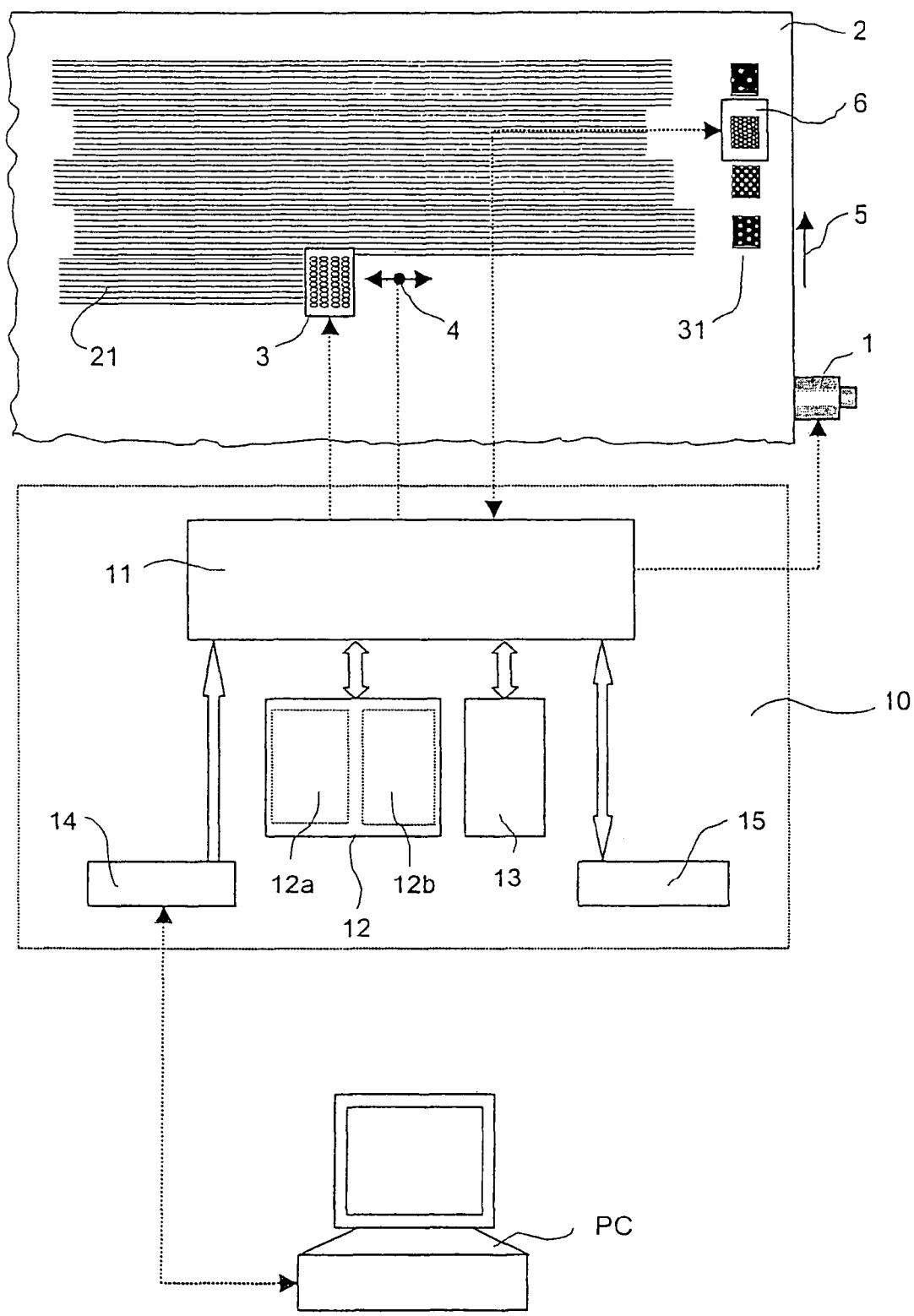
FIG. 1 a principle block diagram of one exemplary embodiment of the digital printer in accordance with the invention.

For reasons of clarity, only those components of the digital printer in accordance with the invention relevant for the present invention are shown in FIG. 1. Apparent is a transport arrangement 1 for a substrate to be printed (paper) 2, typically realized by rollers, a print head 3 equipped with a larger amount of individual nozzles, a drive symbolically illustrated only by a double arrow 4 for the adjustment of the print head 3 transverse to the direction of advance 5 of the paper 2, a spectral measuring head 6 and a digital control 10. The latter includes a computer-based central control unit 11, a program memory 12, a data storage 13, a PC interface 14 and a user-interface 15. By way of the latter, the control 10 can in a generally known manner receive input from the user and, for example, output optical or acoustical information to the user. By way of the PC interface 14, print or other data (for example profiles) can be fed to the digital printer or its control 10 from a computer PC connected thereto.

The control unit 11 executes the device specific control programs 12a found in the program memory 12 and thereby controls in a generally known manner the print head 3, its drive 4 and the transport arrangement 1 for the paper 2 to be printed. The control programs 12a also include a generally known color management module, which carries out a transformation of the print data into the printer color space on the basis of the output profiles stored in the data storage 13 or fed from the connected external PC with the print data or separately and thereby effects the correct color print output.

The control unit 10 furthermore also controls the spectral measurement head 6 and takes over and processes the digital measurement values produced by the spectral measurement head.

A suitable spectral measurement head with the associated electronics for processing the electrical measurement signals into corresponding digital measurement values is described, for example, in EP-A-1041372.

In this generality, the illustrated digital printer corresponds to the prior art as represented, for example, by the document US-A 2002/0080373. The differences in accordance with the invention lie on the one hand in the arrangement of the spectral (or color) measurement head 6 and on the other hand first of all in new functionalities of the digital printer, which are implemented by special software 12b stored in the program memory 12.

Color management systems for the control of printers are today typically realized in the following manner. A computer outputs a two-dimensional test chart to a printer which includes a representative number of colors from the printable color space which are typically defined in RGB or CMYK coordinates. The test chart is thereafter measured with a color measurement device. For reasons of comfort, an automatic xy-scanning color measurement system is often used therefor, for example, the Spectrolino/SpectroScan System of the company Gretag-Macbeth AG. So-called color profiles (for example ICC profiles) are calculated from the relationships of the known RGB or CMYK values and the measured colorimetric values of the test charts by way of mathematical transformations and interpolations. Analogously, ICC profiles can also be generated for input devices such as cameras or scanners. In a typical workflow, PDF files with integrated profiles are created in the printing pre-step. The integrated profiles describe how the integrated images and the line type or the text are to be correctly output in color. The profiles generated for the output device (for example the digital printer) can then be used to reproduce in the correct colors the images or special colors to be output on the printer.

Such systems have been realized in great variety. An example for an application which can calculate printer output profiles according to the ICC standard is the system Profile-Maker of the company Gretag-Macbeth AG. Since the profiling of a printer according to such a process is relatively time consuming and prone to errors because of the large amount of colors which must be measured, it is obvious to further automate the color measurement and, if possible, to also directly integrate it into the output device. A typical embodiment of such a system is described, for example, in US-A 2002/0080373. The movement of the print head transverse to the paper feed direction present in an inkjet printer is thereby used to measure test charts which are output on the printer for the purpose of color measurement either directly during the printing or temporally spaced therefrom. A system as described in that document is however also associated with significant disadvantages. The first essential disadvantage of this embodiment of the measurement device resides in that an additional mass must be moved with the print head. This has a negative effect on the printer speed and/or the system costs. The drive motors must be correspondingly reinforced. The color measurement becomes less reliable because of the high acceleration forces. The additional head movements which are necessary in order to measure the output after the printing further slow down the perceived output speed. A further problem resides in that in this arrangement the measurement head which lies directly beside the print head is potentially soiled by color mist and delivers potentially erroneous values as a result. Furthermore, the ink is shortly after the printing typically not yet completely absorbed by the printed material or dried. The calorimetric values will still significantly change for that reason. The embodiment in accordance with the invention of a spectral or colorimetric measurement head for data capture described in the following solves these problems.

In the embodiment according to the invention shown in FIG. 1, the spectral/colorimetric measurement head is positioned at a fixed position (preferably at the edge at which the paper 2 is guided in the printer) anywhere in paper feed direction after the printing line 21 defined by the position of the printing head 3. The measurement head need thereby not necessarily be mounted at the level of the printing head 3. It is even advantageous to position the measurement head 6 at a certain distance (for example 10 cm) from the printing head 3 in the paper feed direction. Since the measurement head 3 is immovable in this embodiment, it is now necessary to position the measurement fields 31 required for the calculation of an ICC profile in a row (which means one measurement field 31 per printed line). These measurement fields are then typically printed out at that edge along which the paper 2 is guided. All measurement fields 31 which are necessary for the creation of the profile are output in this manner and spectrophotometrically or colorimetrically measured by the measurement head 6. (The printing data required for the output of the measuring fields are part of the software 12b or can also be fed from the connected PC.) After the measuring of all measurement fields 31, the corresponding measurement values are transmitted to a generally known profile calculation module included in the software 12b in the program memory 12. This calculation module generates an output device profile (for example according to the ICC standard) which is stored internally in the data memory 13 of the printer (or possibly also externally in the connected PC) and then later used in a generally known manner for the true color output of pictures and special colors in this printer. The already mentioned software "ProfileMaker" of the company Gretag-Macbeth AG can be advantageously used as the profile calculation module.

Figure 2:
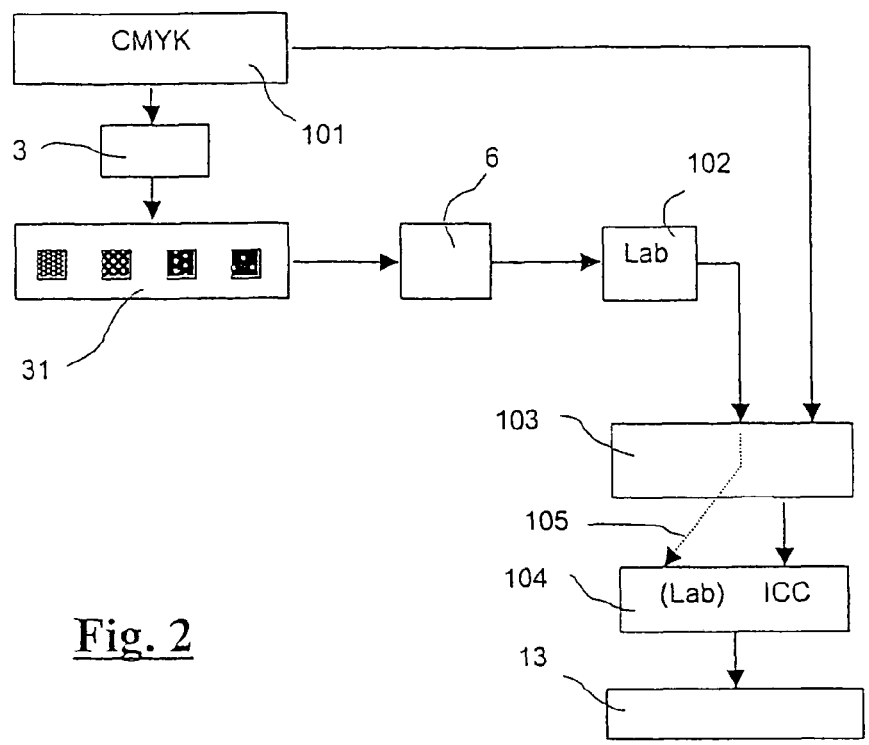
FIG. 2 a block diagram of the profiling function of the digital printer.

FIG. 2 summarizes the above steps: the printing data (for example CMYK) of the measurement fields 31 to be output by way of the printing head 3 are referred to by 101. The color measurement values (for example Lab) of the measurement fields 31 are symbolized by block 102. The printing data 101 and the corresponding color measurement values 102 go into the profile calculation module 103 which calculates therefrom the output profile 104 which is stored in the data storage 13. The color measurement values 102 of selected or all measurement fields 31 can also be integrated, if desired, into the output profile 104. This can be carried out in a known manner, for example, in a so-called Private Tag of the profile. The integration of the color measurement values 102 is symbolized by the broken line arrow 105. The color measurement values integrated in the profile 104 are required, for example, in the further development of the invention described further below.

In some applications, for example based on the desire to save paper, it is desirable to print several measurement fields on one line. The alternative system structure in accordance with the invention and described in the following is suitable for this case, which combines the advantages of a statically mounted measurement head with the advantages of a two-dimensional measurement.

According to this embodiment of the invention, the color measurement device is constructed as a line spectrometer. Such a color measurement device typically has in the illumination a number of monochromatic or narrow band light sources (for example 16 differently colored LEDs) with which light a line-shaped surface can be sequentially illuminated on the paper. The light is thereby applied through an optical system at an angle of 45 degrees onto the paper. In the zero degree angle, the illuminated line to be measured is then imaged by an optical system onto a line sensor (for example a CCD Sensor). A (discrete) spectrum is made available with this measurement principle for each dot of the line by sequentially illuminating the picture with 16 different colors and by detecting the corresponding signals on the sensor and evaluating them.

Alternative constructions of such a line spectrometer are the so-called imaging spectral photometers. The line to be measured in the image is thereby imaged by an optical system onto a two-dimensional detector. In the one dimension of the detector, the image is thereby locally (spatially) resolved, and in the second dimension according to the wavelengths. The illumination in such an imaging spectral photometer is typically realized as white light illumination.

Line spectrometers equipped with several monochromatic light sources as well as imaging spectral photometers are well known and therefore do not require any further description for the person skilled in the art.

Independent of the concrete type of construction of the line spectrometer used, the following functionality is produced program technology wise by the software 12b:

The printer prints a two-dimensional measuring chart at any location on the paper. The line spectral photometer is thereby immovably mounted (transverse to the paper feed direction) exactly at the same location at which the chart is printed. The chart is moved under the line spectral photometer by feeding of the paper. It is thereby possible to capture measurement technology wise all the calorimetric measurement data of the two-dimensional chart. As soon as the measurement data are captured, the measurement data are fed to a profiling module and the corresponding output profiles (for example according to the ICC standard) are calculated. The ICC profiles are then applied during output of the images and special colors in order to produce a correct color output.

In a further aspect of this invention, it is shown how an integrated color measurement device, independent of whether it is a stationary mounted individual measurement head, a stationary mounted line measurement head, or a movable individual measurement head or moveable line measurement head, can be used to significantly simplify the profiling workflow. An independent device profile is namely typically produced for each substrate type (paper), ink type, etc. This is necessary since the color output on different papers and with different colored inks comes out very differently for the same settings of the printing parameters. It would therefore be extremely advantageous when the printer itself could recognize the actually used paper type and could thereby select the corresponding printer profile without user intervention.

Figure 3:
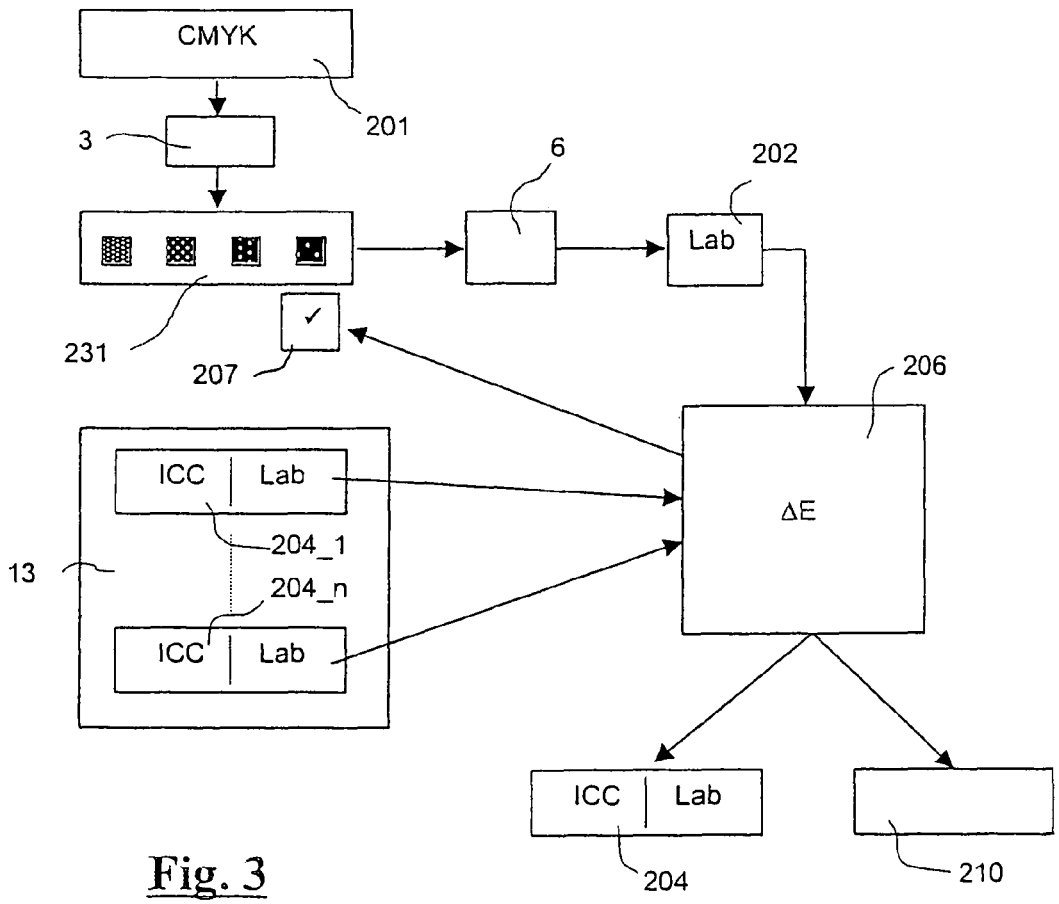
FIG. 3 a block diagram of an automatic profile selection function.

In order to realize this advantageous aspect of the invention, the following approach is program technologically implemented (FIG. 3) through the software 12b:

In a first step, the printer is profiled according to one of the aforedescribed processes and an independent device profile (for example ICC profile) 204_1 . . . 204_n is produced for each common system configuration (ink types, paper types, etc.) and stored in the data memory 13. Furthermore, in each profile the color measurement values (or the corresponding spectral measurement values) of a portion of the measurement fields or alternatively all measurement fields are stored in addition to the actual profiling data. The measurement fields, the color measurement values of which are stored in the profiles, are in the following referred to as test fields for distinction from the measurement fields which are used for the profile generation. These special test fields must thereby always be output the same way (which means without application of a color profile or without adaptation of the color amount or the printing speed). The storage can occur for example in an ICC profile, in that the measurement data are stored in a so-called Private Tag of the profile. Alternatively, additional test fields can be printed out and the measurement data of these additional test fields also stored in the profile. The measurement field types which are selected herefor are typically identical to the measurement field types in an offset printing control strip. The test fields, the data of which are to be stored should be measurement fields which strongly change in color on different papers. Grid fields of the colors CMYK or full tone fields of these colors are typically used therefor. Additionally, the measurement value of paper white ("white field", "paper white") can be stored as well, for example. By storing these typical measurement values of selected measurement fields (test fields) a quasi fingerprint of the behavior of the printer and of the colors on a typical paper is created.

The automatic profile selection is carried out according to the following process which is also included in the software 12b or implemented by it:

The printer initially outputs those few test fields 231 which identify a profile. The underlying printing data are referred to by 201. In the minimal case, only a white field is output, which means absolutely nothing is printed. In this minimal case, only the paper white is therefore used as the test field, the characterization consists only of the measurement of the paper. The test fields are thereafter spectrally and/or colorimetrically measured with the built-in color measurement device 6. The spectral or calorimetric differences to the corresponding measurement values of the test fields of all profiles 204_1 . . . 204_n stored in the data memory 13 of the printer (or in the connected computer) are thereafter calculated in an evaluation module 206. The corresponding measurement values of the private tag of the respective ICC profile are therefor read out and the colorimetric differences to the actual measurement values of the corresponding measurement fields generated. (This can be, for example, a calorimetric difference $\Delta E$ according to the CIELAB formula). The calorimetric differences $\Delta E$ are summed up over all test fields, whereby the sum then results in a color measure which defines and determines the usability of an ICC profile on this substrate (in combination with the respectively used color inks). In the ideal case, the summed up colorimetric difference $\Delta E$ is in the case of the fitting profile almost 0 dE CIELAB, whereby the deviation of the summed up $\Delta E$ differences for non-fitting profiles on the other hand reaches relatively high $\Delta E$ values. If during output of the measurement fields one of the profiles 204_1 . . . 204_n stored in the printer or computer was recognized as fitting (by way of a sufficiently small summed up colorimetric difference $\Delta E$), this profile is automatically set as active profile 204 in the workflow (in the computer or directly in the printer) and then later used for their correct color print output. If no fitting profile is stored, the printer would either output an error message or automatically change into the profiling mode (block 210) and then generate a fitting profile as described in relation to FIG. 2. This check can be triggered selectively automatically at the printer (for example upon each printout) or through user input (user interface 15).

In order to give a return message to the user whether the profile has been tested and fits, the system is expanded according to a further partial aspect of the invention in such a way that after successful testing of the validity of the measurement values of the test fields an additional marker 207 is output in the test strip (totality of the test fields) which indicates the validity of the profile to the user. This marker should typically be output in the vicinity of the printed out test fields so that the user directly associates the marker with the test result. It can thereby be both a graphic marker (checkmark or the like) or a text marker (for example "profile tested on dd. mm. yy").

The aspect of the invention described in the following shows how the correctness or applicability of a profile can be verified by measurements of the print output without outputting a test strip as described in the previous section.

RGB or CMYK print data are typically transmitted to the digital printer. For the following, use is made of the fact that these RGB or CMYK values can be recalculated with the help of the output profile into colorimetric nominal values for the image point to be output. These nominal values can then be compared with the measured, color measurement values. However it must be taken into consideration thereby that a built in measurement head normally has an aperture which is significantly larger than the pixels in the output (for example 1-5 mm diameter).

Figure 4:
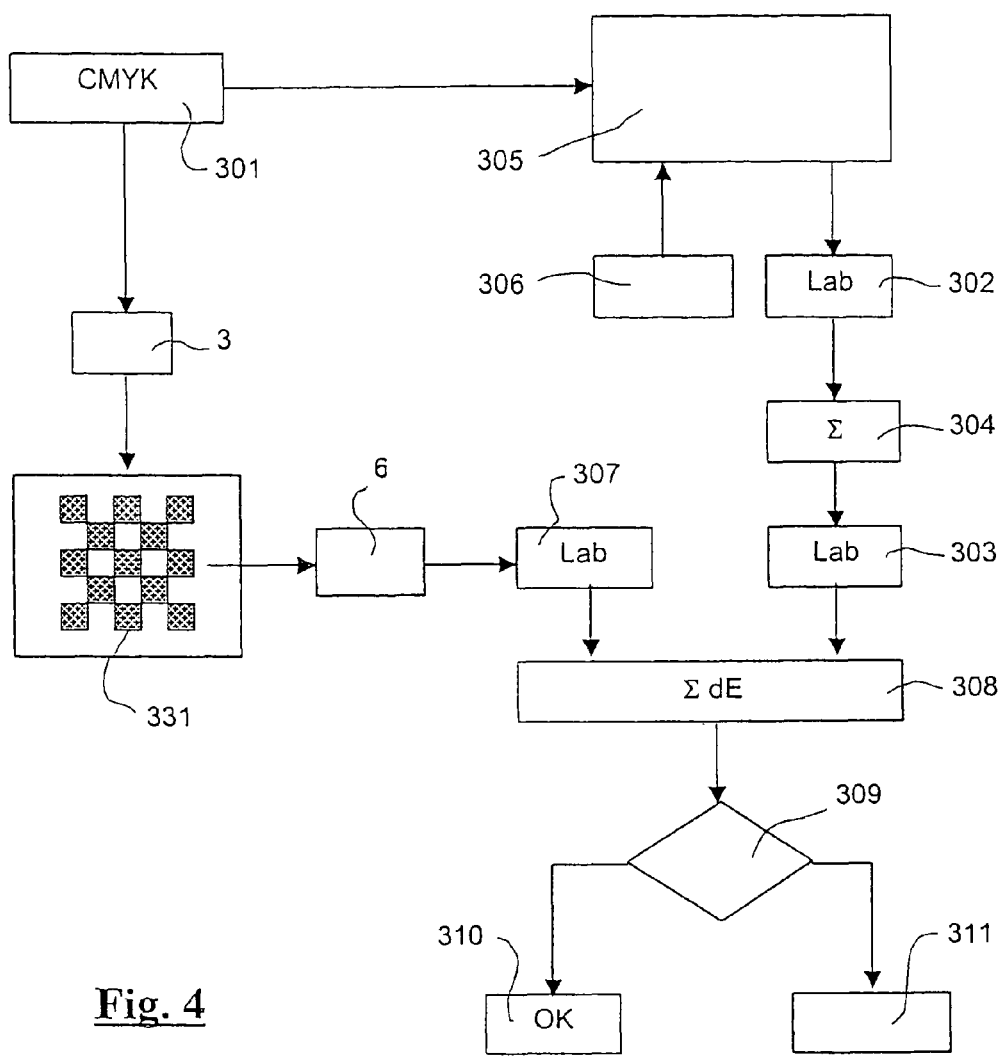
FIG. 4 a block diagram of an automatic profile verification function.

The control of the print output now occurs in the following manner (FIG. 4):

The color measurement device measures a suitable test print at different preset measurement locations 331. These measurement locations can be distributed over the printout in a checkerboard pattern. However, any other arrangement of the measurement locations is also possible. The software 12b in the program memory of the printer determines the colorimetric nominal values for the measurement locations 331 to be tested 303 in that it averages in an averaging stage 304 the calculated colorimetric values 302 of the individual print points which are located within the aperture of a measurement. The calculation of the colorimetric values 302 of the individual print points occurs from the RGB or CMYK values 301 through transformation 305 into the LAB color space by use of the active output profile 306. These averaged LAB values or nominal values 303 then serve as reference values for measurement of the output image at the individual measurement locations 331.

In a further step, the colorimetric differences of the measurement values 307 of the printout to the calculated nominal values 303 of the printout at the individual measurement locations 331 are calculated and averaged. The calculated average dE error 308 is then the measure for the deviation of the actual printout from the desired printout. If this mean error 308 lies below a preset error limit (test 309), the print output is declared valid (OK signaling 310). Otherwise, the user is warned or the system is selectively automatically profiled anew (Profiling 311).

In the aspect of the invention described in the following it is shown how the built-in color measurement device can be used not only for the control of subjects printed with the common standard colors, but also for the control of special color surfaces.

Digital printers are today often able to output so-called special colors apart from the CMYK colors. It can be defined in so-called "named profiles" how a print output system can convert special colors (which are typically designated by color names such as, for example, "Pantone 405C") into colorimetric coordinates. Such "named profiles" can be embedded into PDF files. An alternative way of transferring the conversion tables of color names into calorimetric values to the printer consists in embedding an XML coded conversion table (such as, for example, defined in the CxF data exchange format of the company Gretag-Macbeth AG) into a PDF file and thereby transmitting it with the PDF file to the printer or printer driver.

Figure 5:
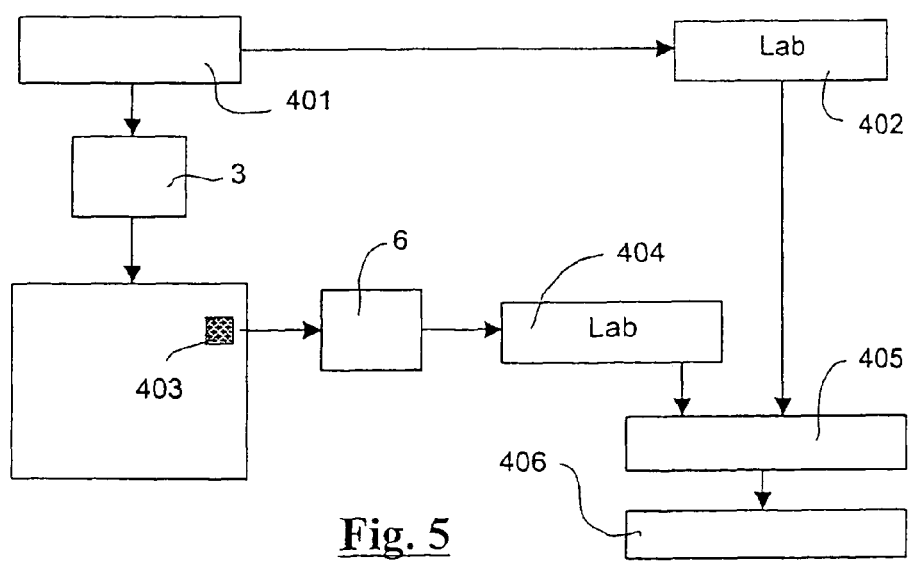
FIG. 5 a block diagram of a verification function for special colors.

As soon as the digital printer now needs to output a special color, the following process is started which is program technologically implemented in the software 12b (FIG. 5):

With the help of the "named profile" 401, the special color to be output is transformed into a colorimetric value or the CxF file embedded into the PDF file. Each special color in the print output can be assigned a colorimetric reference value 402 in this manner. This calorimetric reference value is stored for the measurement. The testing of the special color with the integrated measurement device 6 then occurs according to the following principle:

At those locations at which the special color is output as a spot of suitable size, the special color is measured by a colorimetric XY measurement system and compared with the reference value. Alternatively, a test field 403 of, for example, 5×5 mm² size in the same special color can be output at the edge of the sheet and measured with a fixed or movably mounted measurement head 6 at that location. If the theoretically determined reference value 402 does not deviate from the actual color measurement value 404, or the deviation is smaller than a preset threshold (for example 1.0 dE CIELAB) (comparison 405), the color counts as correctly printed. If all colors were printed correctly, the system signals to the user the correctness of the print output. The signalizing can be carried out, for example, in that a certain marker 406 is output on the printout. Alternatively, the signaling can also be carried out through a user interface 15 of the printer or a message can be output on the screen of the connected computer PC by way of the printer/PC interface 14.

In many applications, especially in the manufacture of so-called "proofs", and especially for the manufacture of remote proofs, it is extremely important that each proof is printed out within a certain preset tolerance. In order to achieve this, print control strips are today typically output. The measurement values of a print control strip (density, tone value increases, colorimetric measurement values) must thereby be within a certain tolerance range in order to prove that the proof does not deviate from the preset standard output conditions. Typically, the print control strips are nowadays measured by an external measurement device (for example a handheld spectral measurement device such as the device SpectroEye of Gretag-Macbeth AG).

Figure 6:
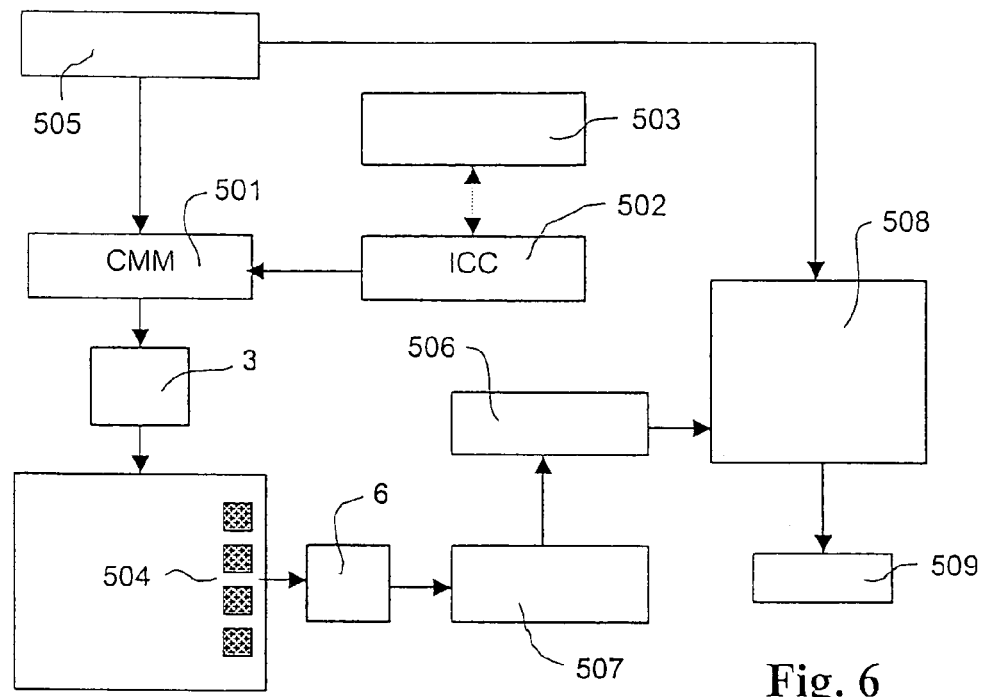
FIG. 6 a block diagram of a testing function for standard conditions.

The aspect of the invention described in the following shows how an integrated spectral/colorimetric measurement device can be advantageously used for the testing of compliance with standard conditions and how the achievement of these standard conditions can be signaled to or documented for the user. The following functions are therefore implemented in the software 12b (FIG. 6):

The profile 502 to be used in a first step in connection with the color management module 501 is selectively tested according to the approach described above in connection with FIG. 4 (Block 503). An additional test wedge with predefined test fields 504 is thereafter output in a second step. The typically colorimetric or spectrally defined test fields 504 of the test wedge are output on the paper with the use of the (possibly previously verified) ICC profile 502. The full tone densities or the colorimetric measurement values of full tone fields or the tone value increase or the colorimetric measurement values of grid fields are typically known from these test fields 504 as digital preset values 505. The built-in measurement device 6 measures the test fields 504 after printing and calculates from the measurement values the absolute densities, tone value increases or colorimetric actual values 506 of these test fields 504 (calculation block 507). A comparison stage 508 then compares the calculated actual values 506 with the digital preset values 505. A deviation from the preset values 505 which lies within the permissible tolerance or exceeds it can then again be selectively signaled to the user by way of a graphical marker 509 or a corresponding test marker which is printed close to the test wedge.

Figure 7:
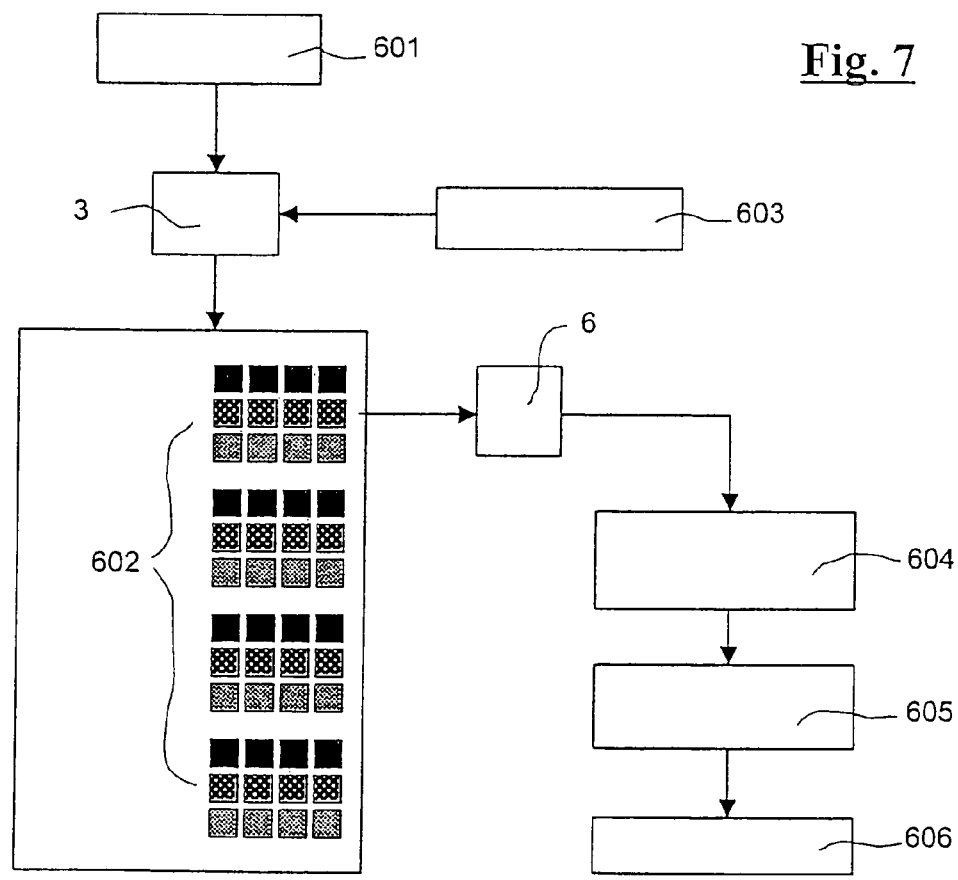
FIG. 7 a block diagram of an initial test function for the optimal amount of color.

The following further aspect of the invention shows a possibility how the built-in colorimetric measurement head 6 can be used to optimize the print color consumption of a digital print output system. Depending on the type of the substrate to be printed (unpainted paper, painted paper, art paper, etc.) the digital printer must output a different amount of print color for the output of a color. This is essentially caused in that on the one hand the largest possible color space should be achieved and thereby tendentially a lot of color must be applied and that on the other hand after a certain color application (depending on the paper type) no more significant enlargement of the color space can be achieved, while other effects can then occur, such as, for example, warping of the paper because of humidity. It is also nonsensical to waste an unnecessary high amount of color only to marginally enlarge the color space. With the functionality in accordance with the invention described below in connection with FIG. 7 the digital printer can be further improved. The functionality is also implemented by corresponding routines in the software 12b.

After a paper change has been carried out (this can be signaled by the user or automatically recognized by the built-in color measurement device 6), a special initial test procedure is started. In this initial test procedure, several measurement wedges 602 (for example respectively two grid values (30%, 70%), and a full tone (100%)) are typically output in the base colors CMYK, whereby the underlying printed data are labeled with 601. The output of these measurement wedges is repeated with different average color amount settings 603. These measurement wedges are then measured for each base color. The color saturation achieved or the color space 604 spanned is then determined for each measurement field of each measurement wedge. A simple process therefor consists in that, for example, the "C" coordinates of the LCh color system of a measurement wedge of one color are added up. The connection between the color spaces 604 achieved and the underlying color media settings 603 are thereafter analyzed in step 605. When the color space 604 achieved no longer significantly changes upon an increase of the amount of color applied (color media amount setting 603), the optimal color media amount setting (amount of color) 606 is achieved. The printouts on this printer are then carried out with this selected amount of color 606, or the printer is later profiled with adherence to this amount of color 606.

The following aspect of the invention shows how the color measurement device 6 integrated into the digital printer can be used to solve the so-called wet/dry problem.

A typical problem which presents itself with a measurement of colors directly after printing is the problem of the comparison of measurement values of a measurement field which was measured immediately after the printing (the wet condition) with the colorimetric/spectral measurement values of a measurement field in the totally dry condition. Because of the drying processes as well as other processes such as, for example, the knocking off, the colorimetric measurement values change during the drying process. Different approaches are known from the literature of how the measurement values in the wet and dry condition can be made compatible. One approach therefor consists, for example, in the measurement with polarized light (EP-A zzzz insert Gretag Case!!!).

Figure 8:
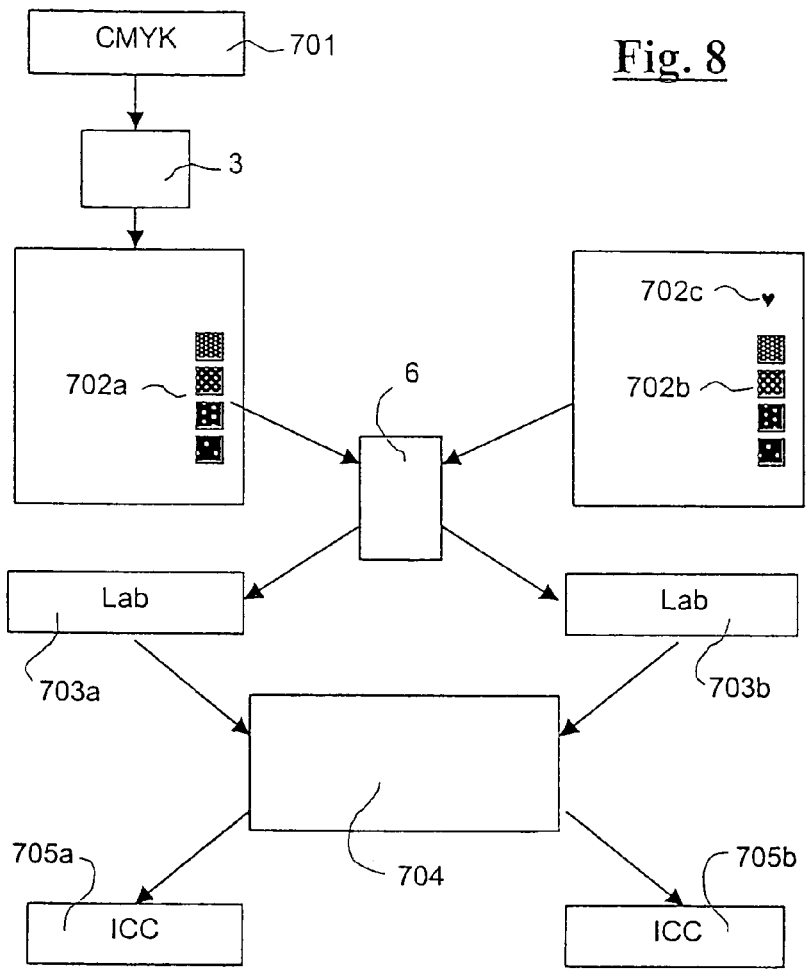
FIG. 8 a block diagram of a function for the calculation of profiles for wet and dried colors, FIG. 9 a block diagram of an alternative function for the calculation of profiles for wet and dried colors.

According to this further aspect of the invention, the built in color measurement device 6 is used to predict the color change of the print color during the drying process and to thereby extrapolate from a measurement of the wet color (which is possible immediately after printing) to the measurement of the dry color important for the user, without having to wait through the drying time. This functionality which is also implemented through routines in the software 12b is described in the following with reference to FIG. 8.

The digital printer is first profiled in a first step. The printer therefor outputs a test chart of the above-described type, whereby the underlying printing data are labeled with 701. The measurement head 6 captures the measurement fields 702a of the test chart immediately after the print and produces therefrom the corresponding color measurement values 703a. After completion of the data collection, a wet device profile 705a is calculated in the profiling module 704. This device profile 705a therefore describes the transformation of RGB or CYMK into the CIELAB color space for wet measurement fields for the respective paper type.

After a complete drying of the printout, the printout is pulled into the printer a second time (this can occur, for example, in that the printed paper is placed into the paper tray for a second time). For distinction from the wet measurement fields 702a, the dry measurement fields are labeled in FIG. 8 with 702b. The system recognizes with the help of the built in color measurement head 6 that it is dealing with already printed paper. On the basis of a selectively printed on color marker 702c, which is scanner by the color measurement head, the printer can further determine which profile was already assigned to this printout in the wet condition. A direct association with a defined paper is thereby achieved.

The printer is now set into a mode in which only the inserted test chart is measured. The measurement values 703b of all measurement fields 702b of the test chart are therefor captured in this second throughput. A dry device profile 705b is then calculated in an analogous manner from the underlying printing data 701 and the color measurement values 703b, which is characteristic for the transformation of CMYK or RGB values into colorimetric values of dry measurements fields. This second profile 705b is within the printer also assigned to the respective paper type.

The two device profiles 705b (dry) and 705a (wet) which are assigned to one paper type are now used in the following manner:

Whenever a file is transmitted from the computer for printout, the profile for the dry measurement values is applied in order to correctly output the colors. The reasoning being that the user wants correct colors in the dried condition. Whenever an RGB or CMYK value must be transformed into a CIELAB value and it is desired to obtain a calorimetric value which represents a color in the wet condition, the profile for the transformation of wet measurement values is applied. The application of the profile for wet values is especially sensible when measurement fields are to be measured directly during processing for the quality insurance or testing of the correct application of the profiles as shown in various above applications.

Figure 9:
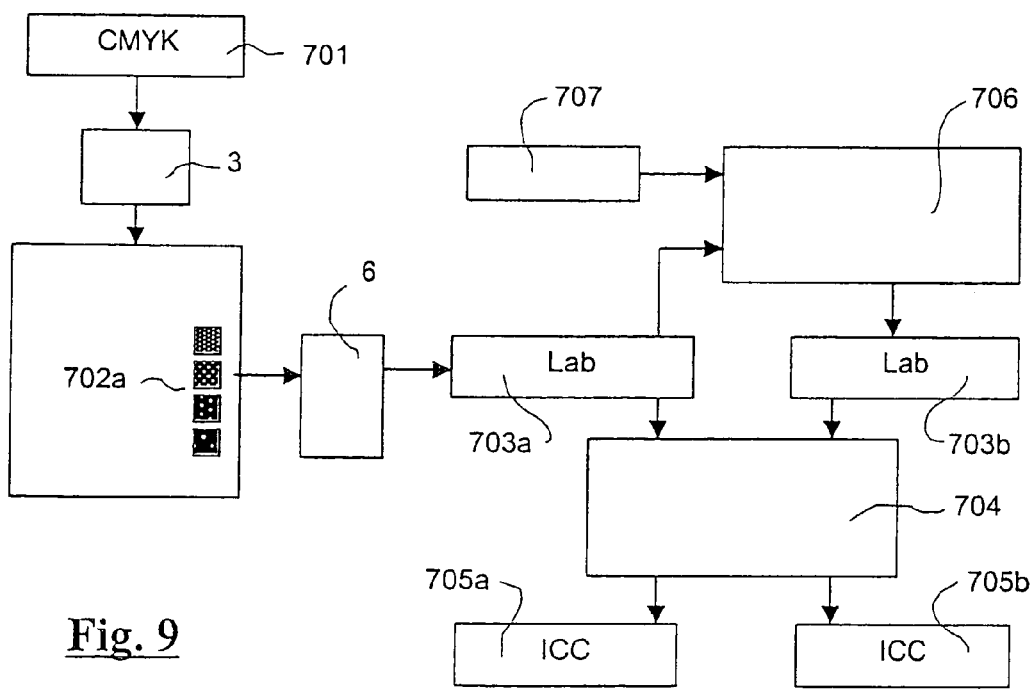

In all those applications where it is not desired to feed the test chart a second time into the printer, one can alternatively also proceed according to the following process (FIG. 9):

The measurement values 703b of the dry sheet are calculated from the measurement values 703a of the wet sheet by way of a physical model 706. The user assumes in that case into which class 707 (painted, unpainted, matte, art print, etc.) the paper belongs. Two parameters must thereby be mainly considered for the model 706. On one hand, the change of the surface effect. This can be typically modeled in that a small reflection value (typically 1% . . . 4%) is added to each reflection value of each measurement value of the wet sample. As a further correction for taking into consideration the knocking off into the paper it is advantageous to consider the scattering additionally contributed by the paper. The respective formulas are generally known (see models of Kubelka/Munk and Hoffmann/Schmelzer). Thus, for each reflection value of the dry measurement fields, the following correction formula results:

$$R\ dry = f(R\ wet, S) + O$$

whereby O is typically a constant which is the same at all wave lengths for all colors and characteristic for the surface effect and S is a constant or wave length dependent parameter which characterizes the scattering behavior of the paper.

The values S and O required for the measured value correction depend on the paper type used and are typical for a one paper. In a further step, the printer therefor reads the corresponding values S and O out of a data bank for the paper class (based on the user setting of the paper type) and recalculates with the help of the model 706 all reflection values into measurement values 703b of a dry sheet.

Starting with these synthetic measurement values 703b, the profile 705b for the dry sheet is then calculated again. Thereafter, the further processing is the same as in the proceeding case, in which the two profiles 705a and 705b (for wet and dry) are assigned to a paper type and applied as in the proceeding case.

Figure 10:
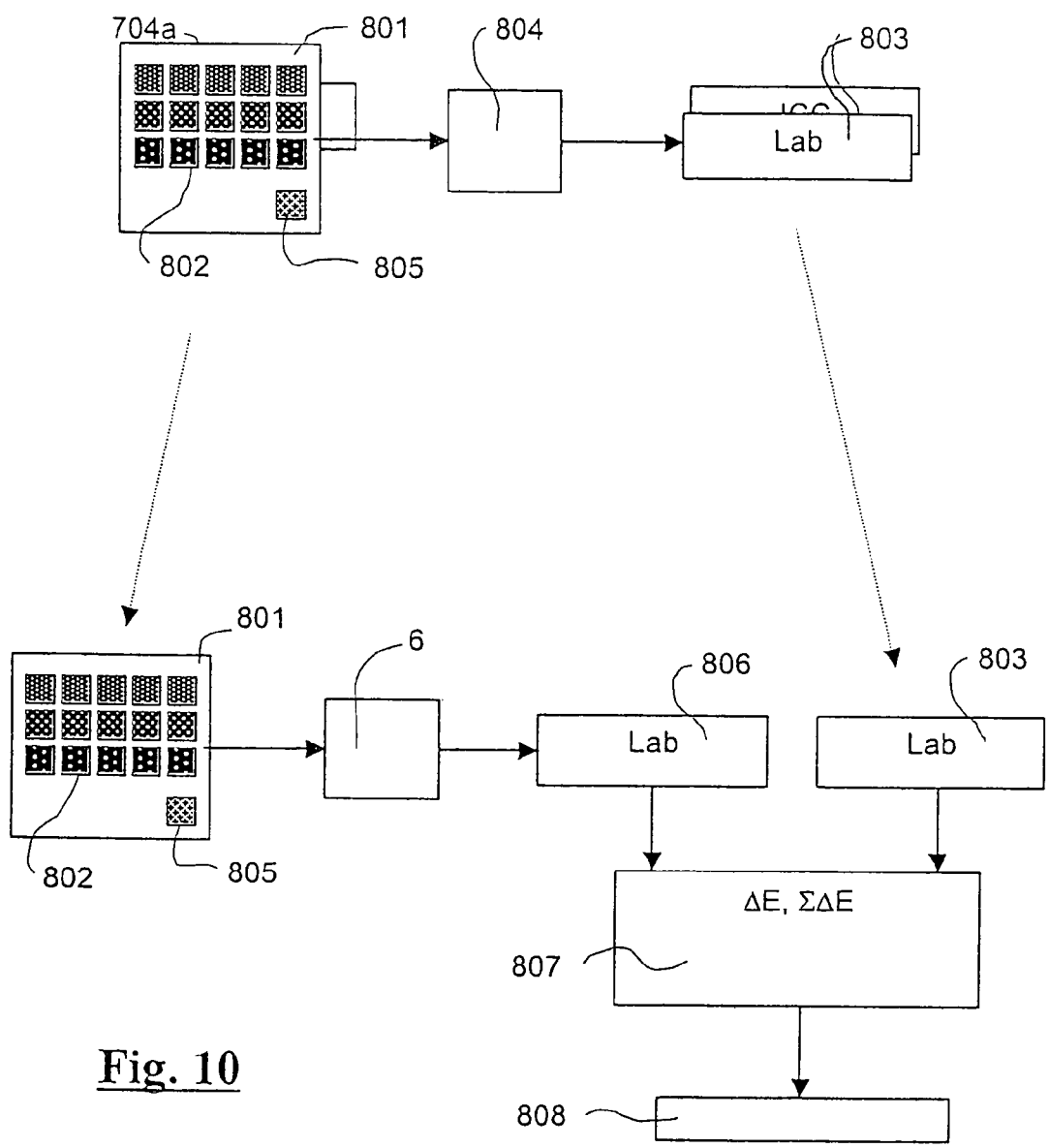
FIG. 10 a block diagram of a calibration function.

The last aspect of the present invention described in the following with reference to FIG. 10 shows how the digital printer can be periodically tested for the compliance with a measurement tolerance and therefore for compliance with a maximum deviation from a standard.

Initially, a calibration chart 801 with a palette of measurement fields 802 in colors which if possible should be distributed over the whole color space, is printed at a suitable location. (These can be, for example, 12 saturated colors from the color circle as well as black, gray, and paper white.) The colorimetric values 803 of these measurement fields 802 are then captured in a central standardizing lab with the help of a spectrophotometer 804. Furthermore, the calibration chart 801 is provided with a color code 805 for identification. Preferably, the calibration chart 801 is built such that white fields are periodically inserted between the colored measurement fields, which serve to increase the precision of the system with the help of an intermediate calibration for paper white.

The printed out calibration chart 801 and the associated measurement data 803 are transmitted to the user for the control of the colorimetric correctness of his printer. The user loads the measurement data onto the printer (through the PC or through a suitable interface at the printer itself). These measurement data 803 represent the reference value.

The chart 801 is thereafter inserted into the paper feed of the printer. The printer recognizes automatically by way of the built-in color measurement device 6 (in that the color code 805 on the chart is detected with a color measurement device 6), that it is dealing with a calibration chart 801. The printed on color fields 802 are measured with intragrated color measurement head and the determined color measurement values 806 compared with the previously loaded reference values 803. A stage 807 therefor calculates the maximum calorimetric deviations as well as the mean colorimetric deviation of the color measurement values 806 of all measurements fields 802 from the reference values 803. If the mean deviation as well as the maximum deviation of any color measurement field 802 lies under a predetermined threshold value, the printer counts as calibrated. The compliance or non compliance with threshold values is then signaled to the user in that, for example, a certificate 808 or a deviation protocol is output on the printer.

The precision of the system can, as already mentioned, be further increased in that an intermediate calibration to paper white is carried out on the basis of the white fields inserted into the calibration chart.

Although exemplary aspects of the invention have been described with reference to schematic illustrations herein, the present disclosure is not limited thereto. Rather, the various devices and systems disclosed herein are susceptible to modification and/or variation without departing from the spirit or scope of the present disclosure.

What is claimed is:

1. Digital printer comprising:
a printing head, drive means for the printing head, a transport device for the substrate to be printed, a color measurement device for the colorimetric measurement of measurement fields found on the substrate and a digital control for the transport device, the printing head, the drive means and the color measurement device, wherein the control includes an interface for the input of digital printing data and other data and a program memory and data storage, which program memory includes control programs required for operation of the printer, which analyze the measurement data produced by the color measurement device and include a color management module, which on the basis of output profiles stored or input through the interface is adapted to transform printing data into the color space of the printer and thereby effects the correct color print output;
wherein an output profile is stored in the data storage for each current system configuration of the digital printer, and wherein each output profile includes info nation or data on at least one of (i) ink type to print, and (ii) substrate type to be printed;
wherein for each output profile, in addition to the actual profiling data, the measured values of test fields produced by the color measurement device are stored;
wherein the control includes a profile selection function which automatically selects the output profile to be used for the print output from a plurality of previously stored output profiles on the basis of measurements carried out automatically by way of the color measurement device on printed out color measurement fields.

2. A printer according to claim 1, wherein the control includes a profiling function which is triggered automatically or by a user and can produce and store an output profile without manual intervention.

3. A printer according to claim 2, wherein the profiling function calculates the output profile on the basis of the color measurement values automatically measured by way of the color measurement device on printed out color measurement fields and by means of the printing data underlying the printout of these color measurement fields.

4. A printer according to claim 2, wherein the profile selection function initiates an automatic Previously Presented profiling by way of the profiling function, when none of the stored output profiles is recognized as suitable.

5. A printer according to claim 1, wherein the control includes a profile verification function which tests the output profile used for the print output on the basis of measurements carried out automatically by way of the color measurement device on printed out color measurement fields for suitability under the given printing conditions and signals the suitability through the output of an image or text marker.

6. A printer according to claim 1, wherein the control includes a profile verification function which tests the output profile used for the print output on the basis of measurements carried out automatically by way of the color measurement device on printed out color measurement fields for suitability under the given printing conditions and signals the suitability through the output of an image or text marker, whereby nominal color measurement values are calculated by color transformation with the applied output profile from the print data for the measurement locations belonging to the image points and those nominal color measurement values compared with color measurement values measured at the measurement locations, and whereby the applied output profile is recognized as suitable when the colorimetric deviations between the calculated nominal color measurement values and the measured color measurement values are below a preset tolerance value.

7. A printer according to claim 5, wherein the profile verification function initiates an automatic Previously Presented profiling by way of the profiling function when the applied output profile is recognized as non-suitable.

8. A printer according to claim 1, wherein the control includes a special color testing function which tests the correctness of printed out special colors on the basis of measurements carried out automatically by way of the color measurement device on a color measurement field including the special color and by comparison of color measurement values obtained thereby with reference values fed to the printer, and signals the result of the comparison by way of a printed out marker.

9. A printer according to claim 1, wherein the control includes a test function for standard conditions, which tests the correctness of printed out colors on the basis of measurements carried out automatically by way of the color measurement device on printed out color test fields with known digital preset values and by comparison of the measurement values obtained thereby with the preset values, and signals the result of the comparison by way of a printed out marker.

10. A printer according to claim 1, wherein the control includes an initial test function for the optimal amount of color medium, whereby the optimal color medium amount setting of the printer is determined on the basis of measurements carried out automatically by way of the color measurement device on color measurement fields printed out with different color medium amount settings, whereby the color spaces achieved with the different color medium amount settings are determined and the lowest color medium amount setting is essentially chosen as the optimal color medium amount setting with an increase of which no substantial expansion of the color space is achieved.

11. A printer according to claim 1, wherein the control includes a profiling function which generates and assigns two output profiles for each substrate, whereby one profile describes the behavior for wet colors and one profile the behavior for dry colors.

12. A printer according to claim 1, wherein the control includes a profiling function for wet and dried print colors, which calculates an output profile for wet print colors on the basis of the color measurement values automatically measured by way of the color measurement device on the printed out and still wet color measurement fields and with the printing data underlying the printout of these color measurement fields and which calculates an output profile for dried printing colors on the basis of the color measurement values measured automatically by way of the color measurement device on the printed out already dried color measurement fields and with the printing data underlying the printout of these color measurement fields.

13. A printer according to claim 1, wherein the control includes a profiling function for wet and dry printing colors which calculates an output profile for wet printing colors on the basis of color measurement values automatically measured by way of the color measurement device on the printed out and still wet color measurement fields and with the printing data underlying the printout of these color measurement fields and calculates an output profile for dried printing colors on the basis of synthetic color values calculated for the color measurement fields and with the printing data underlying the printout of these color measurement fields, whereby the synthetic color values are calculated by modeling from the color measurement values measured on the wet color measurement field.

14. A printer according to claim 13, wherein correction parameters used in the modeling can be preset by the user through input of a substrate group.

15. A printer according to claim 1, wherein the control includes a calibration function which determines on the basis of measurements automatically carried out by way of the color measurement device on the color measurement fields of a calibration chart inserted into the printer and by comparison of the thereby measured color measurement values of the measurement fields with the reference color values of the measurement fields fed to the printer whether the printer is calibrated within preset tolerance limits and signals the result of the comparison by output of a certificate or a deviation protocol.

16. A printer according to claim 15, wherein the calibration function is equipped to read and recognize a color code provided on the calibration chart by way of the color measurement device.

17. A printer according to claim 15, wherein the calibration function is constructed to carry out an intermediate calibration for paper white by way of white fields provided on the calibration chart.

18. A printer according to claim 1, wherein the color measurement device is located stationary in the vicinity of a longitudinal edge of the substrate to be printed and in substrate feed direction relative to the printing head, and the control is equipped to output color measurement fields onto the substrate by way of the printing head one after the other in substrate feed direction at the position of the color measurement device.

19. A printer according to claim 1, wherein the color measurement device is constructed as immovably positioned line scanner and the control is equipped for output onto the substrate of color measurement fields by way of the printing head in a two dimensional arrangement and at the position of the color measurement device.

20. A printer according to claim 1, wherein the color measurement device is motor driven adjustable transverse to the feed direction of the substrate to be printed and the control is equipped to output color measurement fields onto the substrate by way of the printing head and to move the color measurement device to the position of the color measurement fields.

21. A printer according to claim 1, wherein the control includes a readout function in order to read out the nominal color values stored in a profile and to make them available for further use.

22. A printer according to claim 1, wherein the control includes a function which can output to a connected external computer color measurement values measured automatically by way of the color measurement device.

23. A printer according to claim 1, wherein the control includes a function for providing a signal selected from a group consisting of a signal reflecting correct profiling, a signal reflecting adherence to standard values and the correct print output by output of an image or text marker, and any combination thereof.

24. A printer according to claim 1, wherein the control includes a function adapted to produce measurement fields for quality control purposes and output said measurement fields through the print head onto the substrate.

25. A printer according to claim 1, wherein the control includes a function which, during the output of multiple copies, measures each print output by way of the color measurement device at the same locations and outputs thereby obtained color measurement values to the connected computer.

* * * * *